United States Patent
Tanaka et al.

(10) Patent No.: US 11,649,816 B2
(45) Date of Patent: May 16, 2023

(54) HYDRAULIC ACTUATOR CONTROL DEVICE FOR DUMP TRUCK

(71) Applicant: Hitachi Construction Machinery Co., Ltd., Tokyo (JP)

(72) Inventors: Takaaki Tanaka, Tsuchiura (JP); Kazunori Ishihara, Tsuchiura (JP); Jun Ikeda, Tsuchiura (JP); Juri Shimizu, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 6 days.

(21) Appl. No.: 17/597,043

(22) PCT Filed: Nov. 8, 2019

(86) PCT No.: PCT/JP2019/043927
§ 371 (c)(1),
(2) Date: Dec. 23, 2021

(87) PCT Pub. No.: WO2021/090486
PCT Pub. Date: May 14, 2021

(65) Prior Publication Data
US 2022/0235758 A1 Jul. 28, 2022

(51) Int. Cl.
*E02F 9/22* (2006.01)
*F04B 49/06* (2006.01)
*F04B 49/08* (2006.01)

(52) U.S. Cl.
CPC ............. *F04B 49/06* (2013.01); *E02F 9/226* (2013.01); *E02F 9/2296* (2013.01);
(Continued)

(58) Field of Classification Search
CPC ......... E02F 9/2235; E02F 9/226; F04B 49/06; F04B 49/065; F04B 49/08
See application file for complete search history.

(56) References Cited

U.S. PATENT DOCUMENTS 6,308,516 B1 * 10/2001 Kamada ................ F15B 11/167
60/452
8,701,397 B2 * 4/2014 Tanaka ................. E02F 9/2235
60/329
(Continued)

FOREIGN PATENT DOCUMENTS

JP 2006-97575 A 4/2006
JP 2009-228874 A 10/2009
(Continued)

OTHER PUBLICATIONS

International Search Report (PCT/ISA/210) issued in PCT Application No. PCT/JP2019/043927 dated Jan. 28, 2020 with English translation (five (5) pages).
(Continued)

*Primary Examiner* — Michael Leslie
(74) *Attorney, Agent, or Firm* — Crowell & Moring LLP

(57) ABSTRACT

An engine (12) drives a variable capacity-type hydraulic pump (16), discharged hydraulic oil is selectively supplied to a cooling fan (19) and a hoist cylinder (11) in accordance with switching of a selection valve (17), thereby controlling the same on the basis of each target value. A pump discharge pressure (Pp) of the hydraulic oil discharged from the hydraulic pump (16) and a motor supply pressure (Pm) of the hydraulic oil supplied to a hydraulic motor (18) via the selection valve (17) are detected by sensors (27, 28) and are compared with pressure determination values stored in advance as a pump discharge pressure (Pp) and an actuator supply pressure (Pm) generated when the target value is achieved. Presence/absence of abnormality in the hydraulic actuator control device (15) is determined on the basis of a result of the comparison, and when abnormality is determined to have occurred, control is performed to minimize the capacity of the hydraulic pump (16).

5 Claims, 12 Drawing Sheets

(52) U.S. Cl.
CPC ............. *E02F 9/2235* (2013.01); *F04B 49/08* (2013.01); *F04B 2203/0209* (2013.01); *F04B 2205/05* (2013.01)

(56) References Cited

U.S. PATENT DOCUMENTS

| | | | |
|---|---|---|---|
| 9,790,965 B2* | 10/2017 | Joung | E02F 9/226 |
| 10,018,207 B2* | 7/2018 | Vigholm | E02F 9/226 |
| 10,473,127 B2* | 11/2019 | Ohshiro | E02F 9/226 |
| 11,401,695 B2* | 8/2022 | Hyodo | E02F 9/226 |
| 2010/0303643 A1 | 12/2010 | Kataoka et al. | |
| 2011/0011076 A1 | 1/2011 | Tanaka et al. | |
| 2020/0189541 A1 | 6/2020 | Tanaka et al. | |

FOREIGN PATENT DOCUMENTS

| | | |
|---|---|---|
| JP | 2011-168960 A | 9/2011 |
| WO | WO 2019/064343 A1 | 4/2019 |

OTHER PUBLICATIONS

Japanese-language Written Opinion (PCT/ISA/237) issued in PCT Application No. PCT/JP2019/043927 dated Jan. 28, 2020 (three (3) pages).

* cited by examiner

FIG. 12

| OPERATION THAT IS BEING PERFORMED | OUTPUT OF PUMP DISCHARGE PRESSURE DETECTOR | OUTPUT OF VALVE DOWNSTREAM PRESSURE DETECTOR | ASSUMED STATE | ALERT DISPLAY FOR OPERATOR | PUMP CONTROL | | # |
|---|---|---|---|---|---|---|---|
| | | | | | FAN OPERATION | HOIST OPERATION | |
| FAN ROTATION | PRESSURE AT TARGET FAN ROTATION FREQUENCY | PRESSURE AT TARGET FAN ROTATION FREQUENCY | —(NORMAL) | — | ORDINARY CONTROL | | 01 |
| | PRESSURE AT TARGET FAN ROTATION FREQUENCY | OTHERS | VALVE DOWNSTREAM PRESSURE DETECTOR | | PUMP MINIMUM | | 02 |
| | OTHERS | PRESSURE AT TARGET FAN ROTATION FREQUENCY | PUMP DISCHARGE PRESSURE DETECTOR | | PUMP MINIMUM | | 03 |
| | LOW | LOW | HYDRAULIC PUMP, CONTROL VALVE, OIL LEAKAGE | ABNORMALITY IN FAN | PUMP MINIMUM | ORDINARY CONTROL | 04 |
| | HIGH | HIGH | HYDRAULIC PUMP, CONTROL VALVE, LOCK | | PUMP MINIMUM | | 05 |
| | OTHER COMBINATIONS | | ANY ONE OF PRESSURE DETECTORS | | PUMP MINIMUM | | 06 |
| HOIST LIFTING | HOIST CYLINDER OPERATION PRESSURE | LESS THAN THRESHOLD VALUE | —(NORMAL) | — | ORDINARY CONTROL | ORDINARY CONTROL | 07 |
| | HOIST CYLINDER OPERATION PRESSURE | THRESHOLD VALUE OR MORE | VALVE DOWNSTREAM PRESSURE DETECTOR | ABNORMALITY IN HOIST | ORDINARY CONTROL | PUMP MINIMUM | 08 |
| | OTHER COMBINATIONS | | ANY ONE OF PRESSURE DETECTORS, HYDRAULIC PUMP, CONTROL VALVE, HYDRAULIC MOTOR, OR FAN, OR OIL LEAKAGE | | | PUMP MINIMUM | 09 |

HYDRAULIC ACTUATOR CONTROL DEVICE FOR DUMP TRUCK

TECHNICAL FIELD

The present invention relates to a hydraulic actuator control device for a dump truck.

BACKGROUND ART

Dump trucks operated in mines and the like employ a configuration in which cooling fans for cooling a heat exchanger, such as a radiator and an oil cooler, are driven by a hydraulic motor and a rotation frequency of the hydraulic motor is controlled by adjusting a discharge pressure or a discharge flow rate of a hydraulic pump, which is a supply source of hydraulic oil (since the rotation frequency of the hydraulic motor is proportional to the discharge flow rate of the hydraulic pump, it is possible to arbitrarily control the rotation frequency of the hydraulic motor through adjustment of the capacity of the hydraulic pump using a regulator). On the other hand, such a dump truck includes a hydraulic pump that supplies hydraulic oil to a hoist cylinder in order to cause the hoist cylinder to raise and lower a loading platform for unloading. Dump trucks move between loading stations for loading loads and unloading stations for unloading the loads to carry the loads. In general, time required to raise and lower loading platforms using hoist cylinders is significantly shorter than time required to move between the loading stations and the unloading stations, and hydraulic pumps for supplying hydraulic oil to the hoist cylinders are not used in most of the time. Therefore, techniques for using the hydraulic pumps for supplying the hydraulic oil to the hoist cylinders as drive sources for cooling fans as well have been proposed (Patent Document 1, for example).

The discharge pressure and the discharge flow rate are typically controlled by a regulator adjusting a tilt angle of a hydraulic pump. It is possible to arbitrarily control the rotation frequency of the hydraulic motor by the regulator controlling the tilt angle to adjust the capacity of the hydraulic pump.

However, if breakdown of a control device, disconnection of a signal line connecting the control device to the regulator of the hydraulic pump, or the like (hereinafter, referred to as abnormality in a regulator control system of a hydraulic pump) occurs for some reason, it is not possible to supply an appropriate control pressure to a piston inside the regulator. Thus, it is not possible to appropriately control the capacity of the hydraulic pump and to appropriately control the rotation frequency of the hydraulic motor by causing the discharge pressure and the discharge flow rate of the hydraulic pump to change.

In a case in which such abnormality occurs, and the rotation frequency of a fan causes unnecessarily high-speed rotation, this leads to an increase in the amount of energy consumption, an increase in noise of the fan, an early-stage decrease in lifetimes of the fan and the hydraulic devices such as a hydraulic motor, and an increase in a risk of breakdown. Also, in a case in which the rotation frequency of the fan becomes unstable, a repeated stress on the fan and the hydraulic devices such as a hydraulic motor occurs, and this leads to an early-stage decrease in lifetimes and an increase in a risk of breakdown.

As a measure for such failures as described above, Patent Document 2 describes a fan control device adapted to control tilt of a hydraulic pump when abnormality occurs in a regulator control system using a pressure difference in a hydraulic circuit and thereby operate a fan at an intermediate rotation frequency between a maximum value and a minimum value. Specifically, a second pressure setting valve for adjusting a pressure to be supplied to a regulator using a balance between a pressure of hydraulic oil and a spring force is provided, and in a case in which abnormality occurs in the regulator control system for some reason, the regulator is caused to operate on the basis of a setting pressure of the second pressure setting valve to cause the fan to operate at the intermediate rotation frequency between the maximum and minimum rotation frequencies.

PRIOR ART DOCUMENT

Patent Document

Patent Document 1: U.S. Patent Publication No. 2010/0303643
Patent Document 2: Japanese Patent Laid-Open No. 2006-097575

SUMMARY OF THE INVENTION

Problems to be Solved by the Invention

However, according to the technique in Patent Document 2, the fan is operated at the intermediate rotation frequency between the maximum and minimum rotation frequencies when abnormality occurs in the regulator control system, while all the amount of energy consumption, noise of the fan, an early-stage decrease in lifetimes of the fan and the hydraulic devices such as a hydraulic motor, and a risk of breakdown are still in high levels in a case in which maximum values of the discharge pressure and the discharge flow rate of the hydraulic pump are large.

Also, abnormality related to the hydraulic actuator control device is not limited to the abnormality in the regulator control system of the hydraulic pump. In a case in which a device such as a hydraulic valve is provided between the hydraulic pump and the hydraulic motor, for example, there may be a case in which abnormality occurs in such a device or a control system for such a device, and in other cases, abnormality may occur in the hydraulic motor, the fan driven by the hydraulic motor, or the like. Since the rotation frequency of the fan cannot appropriately be controlled at the time of occurrence of such abnormality as well, this may lead to an increase in the amount of energy consumption, an increase in noise of the fan, an early-stage decrease in lifetimes of the fan and the hydraulic devices such as a hydraulic motor, and an increase in a risk of breakdown similarly to the above case.

The present invention was made in order to solve such problems, and an object thereof is to provide a hydraulic actuator control device for a dump truck capable of determining not only abnormality occurring in a regulator control system but also other abnormality in each part of the hydraulic actuator control device and preventing failures caused by the abnormality in advance.

Means for Solving the Problems

In order to achieve the above object, the present invention provides a hydraulic actuator control device for a dump truck including a variable capacity-type hydraulic pump that is driven and rotated by an engine and has a capacity adjusted by a regulator, a hydraulic motor, to which hydraulic oil is supplied from the hydraulic pump, which is driven on the basis of a first pressure target value to drive and rotate a cooling fan for cooling a heat exchanger, a hoist cylinder, to which the hydraulic oil is supplied from the hydraulic pump, which is driven on the basis of a second pressure target value to raise and lower a loading platform for carrying loads, a selection valve that selectively supplies the hydraulic oil from the hydraulic pump to the hydraulic motor or the hoist cylinder, and an arithmetic operation control unit that controls drive of the regulator of the hydraulic pump and the selection valve to achieve the first or second pressure target value, the hydraulic actuator control device for a dump truck including: a pump discharge pressure sensor that detects a pressure of the hydraulic oil discharged from the hydraulic pump as a pump discharge pressure; an actuator supply pressure sensor that detects a pressure of the hydraulic oil supplied to the hydraulic motor via the selection valve as an actuator supply pressure; and an abnormality determination unit that determines presence/absence of abnormality in the hydraulic motor or the hoist cylinder on the basis of the pump discharge pressure and the actuator supply pressure, wherein the arithmetic operation control unit drives the regulator and performs control to minimize the capacity of the hydraulic pump in a case in which the abnormality determination unit determines that abnormality has occurred in the hydraulic motor or the hoist cylinder.

Advantageous Effects of the Invention

According to the hydraulic actuator control device for a dump truck of the present invention, it is possible to determine not only abnormality occurring in a regulator control system but also other abnormality occurring in each part of the hydraulic actuator control device, thereby to promote an operator to appropriately address the abnormality by notifying the operator of the abnormality, and to prevent failures caused by the abnormality in advance.

BRIEF DESCRIPTION OF THE DRAWINGS

FIG. 12 is an abnormality determination table used to determine abnormality in the hydraulic actuator control device.

MODE FOR CARRYING OUT THE INVENTION

Hereinafter, an embodiment in which the present invention is implemented as a hydraulic actuator control device for a heavy-duty dump truck used in mines or the like will be described.

Figure 1:
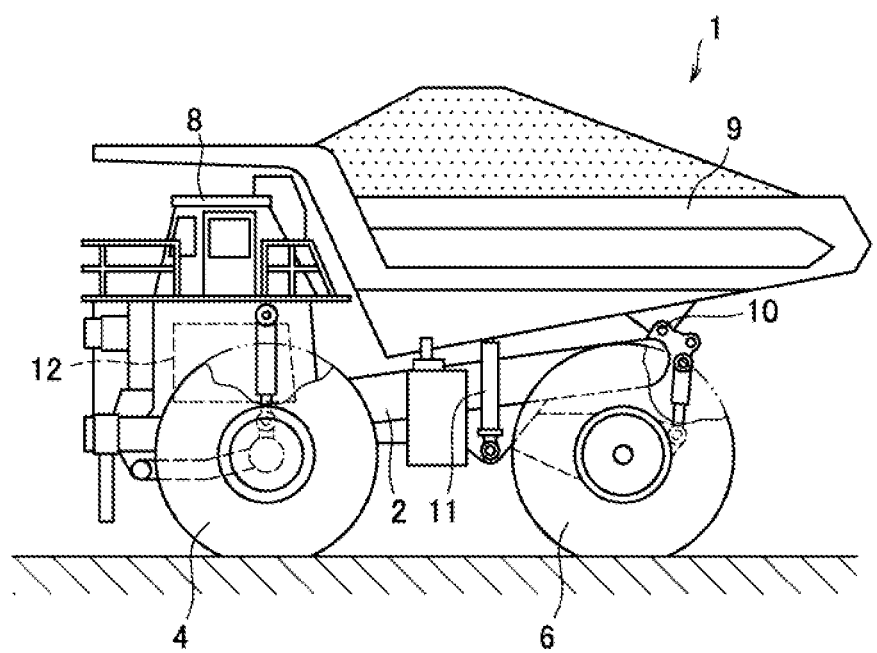
FIG. 1 is a side view illustrating a state in which a loading platform of a dump truck to which a hydraulic actuator control device according to an embodiment is applied is at a carrying position.
Figure 2:
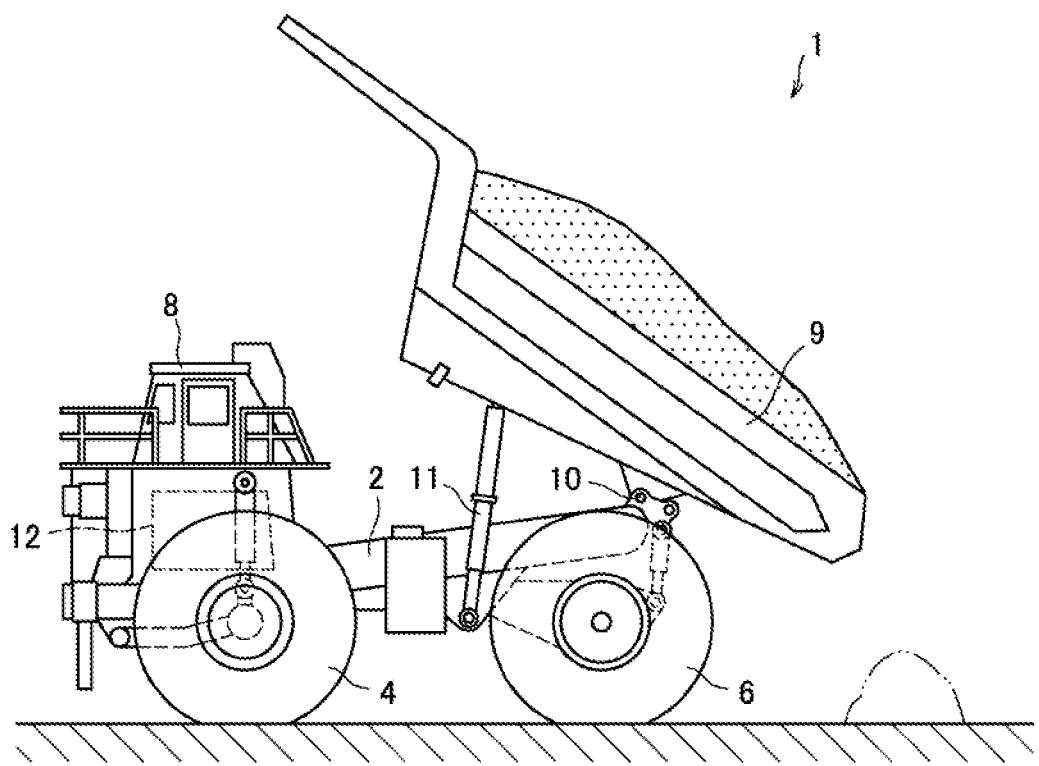
FIG. 2 is a side view illustrating a state in which the loading platform of the same dump truck is at a discharging position.
Figure 3:
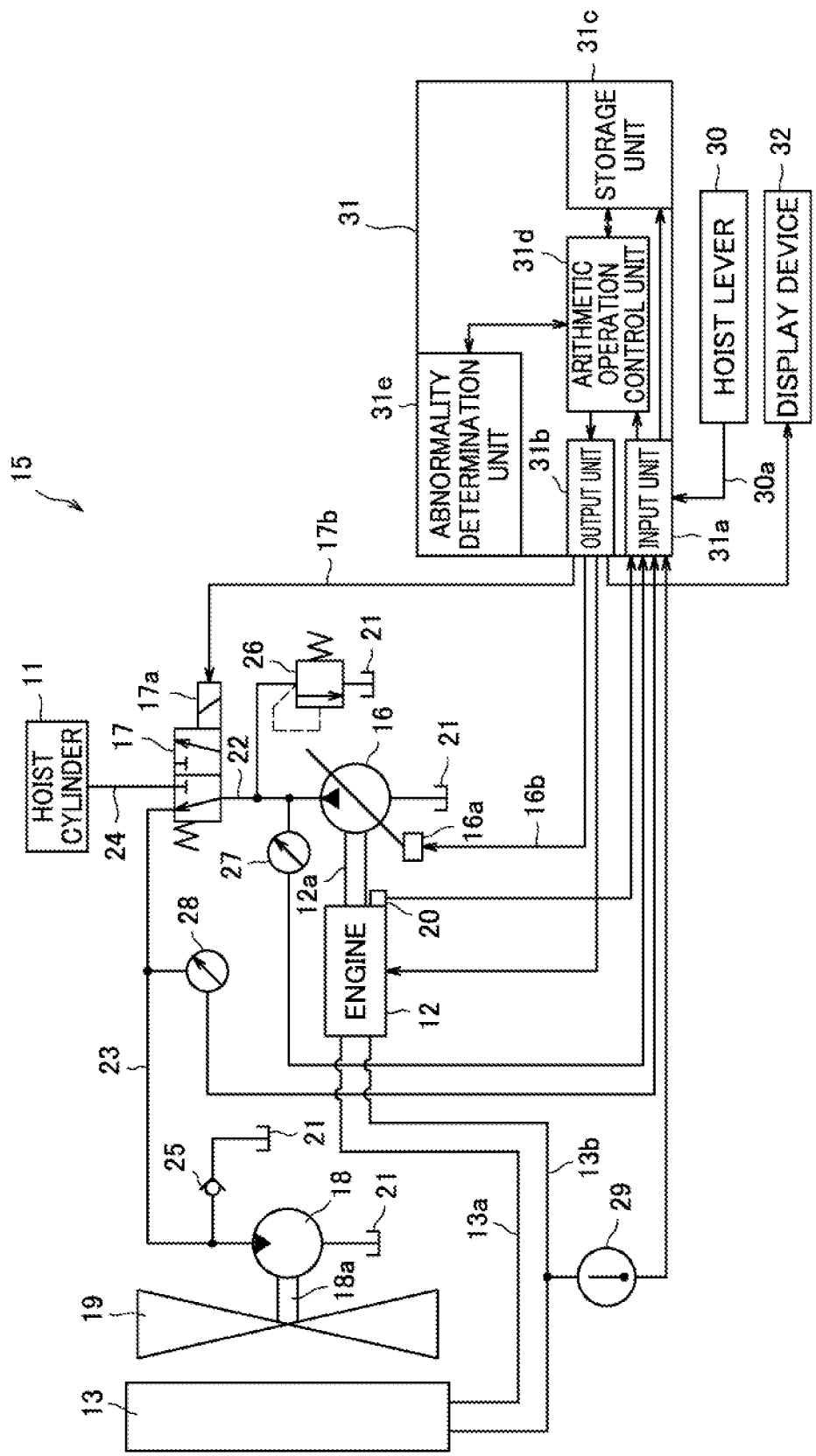
FIG. 3 is a hydraulic circuit diagram illustrating the hydraulic actuator control device for a dump truck.

FIG. 1 is a side view illustrating a state in which a loading platform of a dump truck to which the hydraulic actuator control device according to the embodiment is applied is at a carrying position, FIG. 2 is a side view illustrating a state in which the loading platform of the same dump truck is at a discharging position, and FIG. 3 is a hydraulic circuit diagram illustrating the hydraulic actuator control device for a dump truck. A dump truck 1 is used to carry crushed stones, earth and sand, and the like mined in mines or the like (hereinafter, referred to as mined articles), and in the following description, front-back, left-right, and up-down directions will be expressed with respect to an operator on the dump truck as a subject.

A loading platform 9 for carrying mined articles thereon is disposed above a vehicle body frame 2 of the dump truck 1, and the loading platform 9 is coupled to the vehicle body frame 2 via a pair of left and right hinges 10 and a pair of left and right hoist cylinders 11. The loading platform 9 is adapted to be raised and lowered between the carrying position illustrated in FIG. 1 and the discharging position illustrated in FIG. 2 around the hinges 10 in accordance with stretching of each hoist cylinder 11.

A driving room 8 is provided at a front portion of the vehicle body frame 2, an engine 12 that is a motor is mounted as a power source, a radiator 13 (illustrated in FIG. 3) for cooling engine cooling water is disposed, and the radiator 13 circulates the cooling water between itself and the engine 12 via cooling water passages 13a and 13b. Heat generated by the engine 12 is transported to the radiator 13 with the cooling water and is then discharged to air by wind generated by a fan 19 rotated by a hydraulic motor 18. As will be described later, the engine 12 also functions as a drive source of a hydraulic pump 16, and the hoist cylinders 11 or the hydraulic motor 18 is driven by the hydraulic oil discharged from the hydraulic pump 16.

Also, mined articles are loaded on the loading platform 9 of the dump truck 1, which has been switched to the carrying position, using a hydraulic excavator or the like at a mining point where the mined articles are mined. Once the loading is completed, the dump truck 1 travels to a mud discharging point, switches the loading platform 9 to the discharging position, discharges the mined articles, goes back to the mining point again where mined articles are loaded, and repeats the aforementioned operations.

In the present embodiment, the dump truck 1 is provided with a hydraulic actuator control device 15 in order to drive the hoist cylinders 11 and the hydraulic motor 18. Hereinafter, a configuration of the hydraulic actuator control device 15 will be described on the basis of FIG. 3.

The hydraulic actuator control device 15 includes the engine 12, the hydraulic pump 16, the selection valve 17, the hydraulic motor 18, and the cooling fan 19 as described above, an engine rotation frequency sensor 20, a hydraulic oil tank 21, a pump pipe conduit 22, a cooling fan pipe conduit 23, an operation machine pipe conduit 24, a check valve 25, a relief valve 26, a pump discharge pressure sensor 27, a motor supply pressure sensor 28, a hoist lever 30, and a control device 31.

The control device 31 includes an input unit 31a, an output unit 31b, a storage unit 31c, an arithmetic operation control unit 31d, and an abnormality determination unit 31e.

The hydraulic pump 16 is connected to a rotation shaft 12a of the engine 12 that is a drive source and rotates at a rotation frequency that is equivalent to that of the engine 12. The engine 12 rotates at a rotation frequency in accordance with operation states of the hoist cylinders 11 and the hydraulic pump 16. The rotation shaft 12a of the engine 12 is provided with the engine rotation frequency sensor 20 to detect a rotation frequency of the rotation shaft 12a (hereinafter, referred to as an engine rotation frequency N1 ($min^{-1}$)).

An inlet port of the hydraulic pump 16 is connected to the hydraulic oil tank 21, and an outlet port of the hydraulic pump 16 is connected to a flow-in port of the selection valve 17 via the pump pipe conduit 22. A flow-out port of the selection valve 17 is connected to the hoist cylinders 11 via the operation machine pipe conduit 24 and is also connected to a flow-in port of the hydraulic motor 18 via the cooling fan pipe conduit 23.

The selection valve 17 includes a valve drive body 17a that arbitrarily controls an opening area of the two flow-out ports. In the following description, the switching state of the selection valve 17 will be expressed on the basis of an opening area A1 ($mm^2$) of the flow-out port on the side of the hydraulic motor 18. Therefore, the flow-out port on the side of the hydraulic motor 18 is fully opened while the flow-out port on the side of the hoist cylinders 11 is fully closed when the opening area A1 is the maximum A1max, and opened/closed states that are opposite to those described above are achieved when the opening area A1 is zero.

Therefore, the hydraulic pump 16 suctions the hydraulic oil inside the hydraulic oil tank 21 and discharges the hydraulic oil to the selection valve 17 through the drive of the engine 12, and the hydraulic oil is selectively supplied to the side of the hydraulic motor 18 or the side of the hoist cylinders 11 in accordance with the switching state of the selection valve 17.

The relief valve 26 that defines the maximum pressure in the hydraulic circuit of the hydraulic actuator control device 15 is provided in the pump pipe conduit 22, a flow-in port of the relief valve 26 is connected to the pump pipe conduit 22, and a flow-out port of the relief valve 26 is connected to the hydraulic oil tank 21. The pump discharge pressure sensor 27 is connected to the pump pipe conduit 22 to detect a discharge pressure from the outlet port of the hydraulic pump 16 (hereinafter, referred to as a pump discharge pressure Pp (MPa)). The motor supply pressure sensor 28 is connected to the cooling fan pipe conduit 23 to detect a discharge pressure from the outlet port of the selection valve 17, in other words, a supply pressure to the hydraulic motor 18 (hereinafter, referred to as a motor supply pressure Pm (MPa), which corresponds to the actuator supply pressure of the present invention).

The cooling fan 19 is connected to a rotation shaft 18a of the hydraulic motor 18, and a radiator 13 is disposed to face the cooling fan 19. The cooling fan 19 is driven and rotated by the hydraulic motor 18, and the engine cooling water distributed inside the radiator 13 is cooled with cooling wind generated by the cooling fan 19. The check valve 25 that allows a flow of the hydraulic oil directed to the hydraulic motor 18 and inhibits a flow in the opposite direction is provided between the hydraulic motor 18 and the hydraulic oil tank 21. The cooling water passage 13b of the radiator 13 is provided with a cooling water temperature sensor 29 for detecting a temperature Tw of the engine cooling water.

The engine rotation frequency sensor 20, the pump discharge pressure sensor 27, the motor supply pressure sensor 28, and the cooling water temperature sensor 29 are connected to the input unit 31a of the control device 31, and the hoist lever 30 is also connected thereto via a signal line 30a. Also, a regulator 16a of the hydraulic pump 16 is connected to the output unit 31b of the control device 31 via a signal line 16b, and the valve drive body 17a of the selection valve 17 is also connected thereto via a signal line 17b.

The hydraulic pump 16 is a variable capacity-type pump, and if a tilt angle of an oblique plate changes, a displacement volume (hereinafter, referred to as a pump capacity qp (cc/rev) changes. The oblique plate of the hydraulic pump 16 is driven by the regulator 16a. A discharge flow rate of the hydraulic pump 16 (hereinafter, referred to as a pump discharge flow rate Qp (L/min) is obtained by multiplying the pump capacity qp by the engine rotation frequency N1.

The regulator 16a is an electromagnetic drive-type actuator, for example, and causes the oblique plate to change in accordance with the control amount output from the output unit 31b of the control device 31 (hereinafter, referred to as a pump control amount Cp(A)). The pump control amount Cp is applied to the regulator 16a in the form of a command current for driving the regulator 16a, for example, by the output unit 31b.

The selection valve 17 causes the hydraulic oil supplied to the flow-in port to pass to the flow-out port. The valve drive body 17a selectively switches the supply destination of the hydraulic oil in accordance with the command current (hereinafter, referred to as a valve control amount Cv(A)) output from the output unit 31b of the control device 31.

Figure 4:
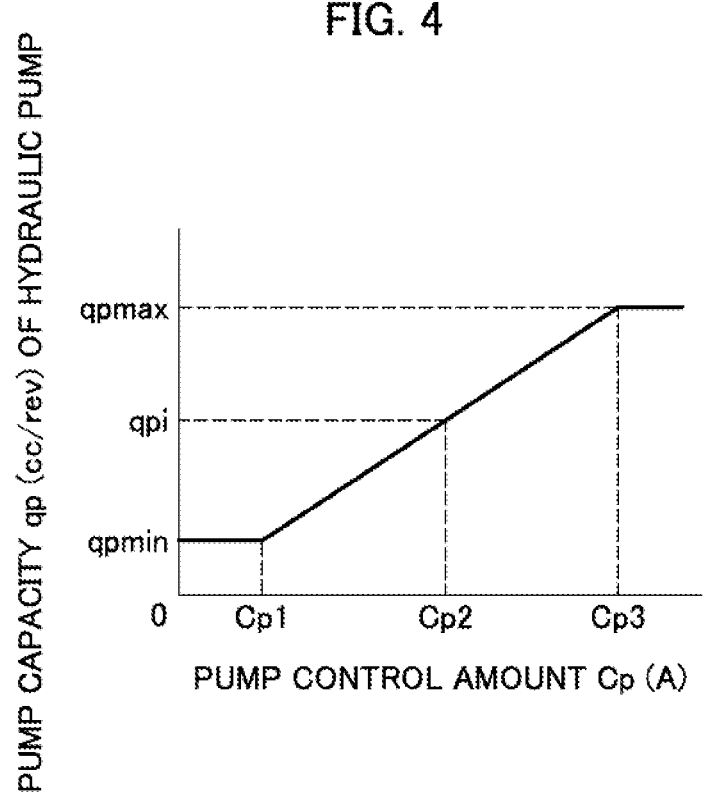
FIG. 4 is a graph illustrating a relationship between a pump control amount and a pump capacity input to a regulator of a hydraulic pump.

FIG. 4 is a graph illustrating a relationship between the pump control amount Cp and the pump capacity qp of the hydraulic pump 16 illustrated in FIG. 3, which are input to the regulator 16a.

Here, in a case in which the pump control amount Cp is equal to or less than a first pump control amount Cp1, the pump capacity qp of the hydraulic pump 16 is a minimum pump capacity qpmin of the hydraulic pump 16. Also, in a case in which the pump control amount Cp is any value between the first pump control amount Cp1 and a third pump control amount Cp3 (hereinafter, referred to as a second pump control amount Cp2), the pump capacity qp is a pump capacity qpi in accordance with the second pump control amount Cp2. Moreover, in a case in which the pump control amount Cp is equal to or greater than the third pump control amount Cp3, the pump capacity qp of the hydraulic pump 16 is a maximum pump capacity qpmax of the hydraulic pump 16.

As is obvious from the above description, the hydraulic pump 16 applied to the hydraulic actuator control device 15 according to the present embodiment is configured to be of a positive control type with a property of reducing the pump capacity qp with a decrease in pump control amount Cp.

Note that although the selection valve 17 in the present embodiment is a normal open-type two-position selection valve that increases the opening area A1 with a decrease in valve control amount Cv, a normal close-type two-position selection valve with an opposite property may be used instead.

Figure 5:
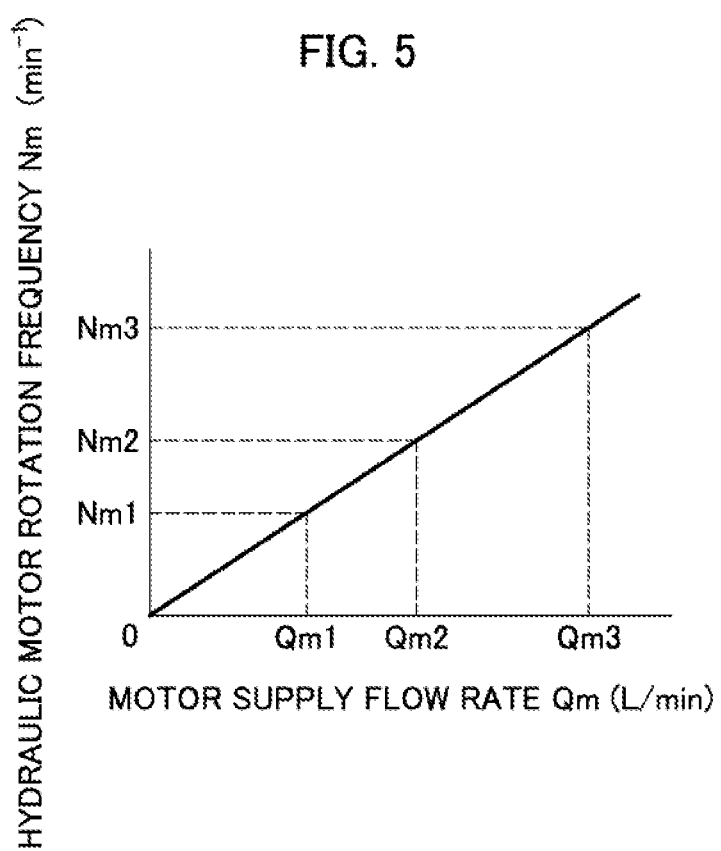
FIG. 5 is a graph illustrating a relationship between a motor supply flow rate and a motor rotation frequency of a hydraulic motor.

FIG. 5 is a graph illustrating a relationship between the motor supply flow rate Qm and the motor rotation frequency Nm of the hydraulic motor 18 illustrated in FIG. 3.

Here, in a case in which the motor supply flow rate Qm is a first motor supply flow rate Qm1, the motor rotation frequency Nm is a first motor rotation frequency Nm1 that is proportional to the first motor supply flow rate Qm1. Also, in a case in which the motor supply flow rate Qm is a second motor supply flow rate Qm2, the motor rotation frequency Nm is a second motor rotation frequency Nm2 that is proportional to the second motor supply flow rate Qm2. Moreover, in a case in which the motor supply flow rate Qm is a third motor supply flow rate Qm3, the motor rotation frequency Nm is a third motor rotation frequency Nm3 that is proportional to the third motor supply flow rate Qm3. In this manner, the motor rotation frequency Nm is proportional to the motor supply flow rate Qm.

Figure 6:
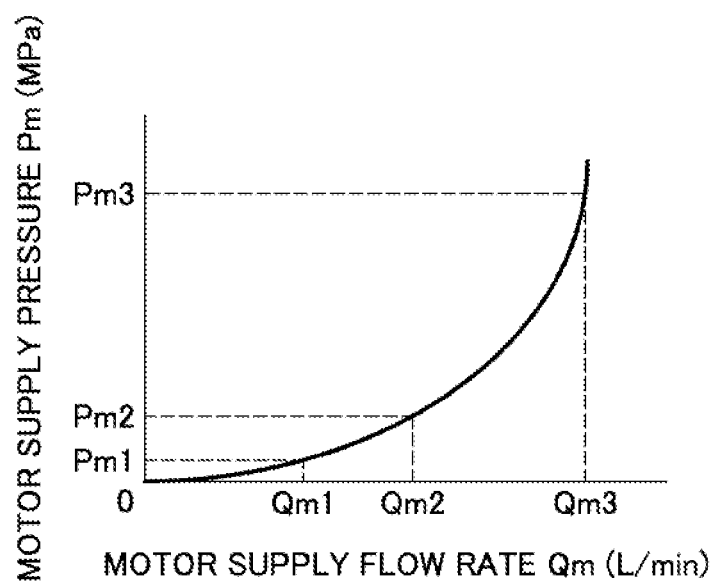
FIG. 6 is a graph illustrating a relationship between the motor supply flow rate and a motor supply pressure of the hydraulic motor.

FIG. 6 is a graph illustrating a relationship between the motor supply flow rate Qm and the motor supply pressure Pm of the hydraulic motor 18 illustrated in FIG. 3.

Here, in a case in which the motor supply pressure Qm is the first motor supply flow rate Qm1, the motor supply pressure Pm is a first motor supply pressure Pm1 that is proportional to a square of the first motor supply flow rate Qm1. Also, in a case in which the motor supply pressure Qm is the second motor supply flow rate Qm2, the motor supply pressure Pm is a second motor supply pressure Pm2 that is proportional to a square of the second motor supply flow rate Qm2. Moreover, in a case in which the motor supply pressure Qm is the third motor supply flow rate Qm3, the motor supply pressure Pm is a third motor supply pressure Pm3 that is proportional to a square of the third motor supply flow rate Qm1. In this manner, the motor supply pressure is proportional to the square of the motor supply flow rate Qm.

Figure 7:
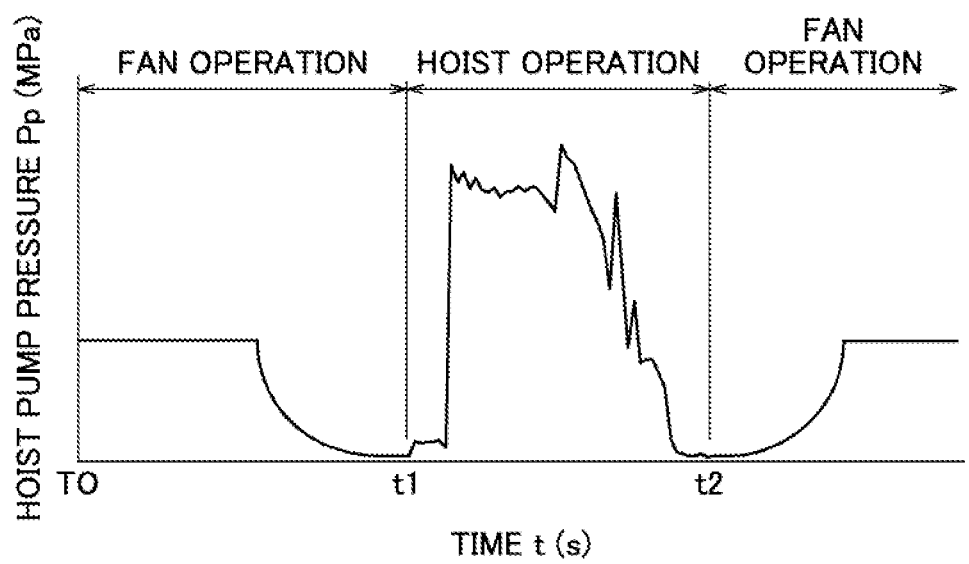
FIG. 7 is a graph illustrating a pressure during rotation of a fan and a pressure during an operation of a hoist cylinder when the hydraulic pump of the dump truck operates.

FIG. 7 is a graph illustrating a pressure when the fan 19 is caused to operate and a discharge pressure of the hydraulic pump 16 when the hoist cylinders 11 are caused to operate. In FIG. 7, the fan 19 is in an operating state from a time point t0 to t1, and the pressure of the hydraulic oil discharged from the hydraulic pump 16 at this time is a pressure in accordance with the rotation speeds of the fan 19 and the hydraulic motor 18. The hoist cylinders 11 are in an operating state from the time point t1 to t2, and the pressure of the hydraulic oil discharged from the hydraulic pump 16 at this time becomes a pressure necessary for the hoist cylinders 11 to lift the loading platform 9. Note that the pressure necessary for the hoist cylinders 11 changes depending on the mass of the mined articles loaded on the loading platform 9. Also, if the masses of the loading platform 9 and the mined articles loaded thereon do not change, the operation speed changes while the pressure necessary for the operations does not change in a case in which the amount of hydraulic oil supplied from the hydraulic pump 16 to the hoist cylinders 11 is caused to increase or decrease. This is known as a Pascal's principle, in general. In other words, it is possible to recognize that the hoist cylinders 11 can be operated while the operation speed becomes low if the flow rate of the hydraulic oil discharged from the hydraulic pump 16 is reduced.

As described above, it is possible to control the motor rotation frequency Nm of the hydraulic motor 18 and thus the rotation frequency Nfr ($min^{-1}$) of the cooling fan 19 by controlling the selection valve 17 to supply the hydraulic oil discharged from the hydraulic pump 16 to the hydraulic motor 18 and controlling the pump capacity qp of the hydraulic pump 16 in accordance with the rotation frequency N1 of the engine 12 to control the pump discharge pressure Pp and the pump discharge flow rate Qp. Also, it is possible to control operations of the hoist cylinders 11 by controlling the selection valve 17 to supply the hydraulic oil discharged from the hydraulic pump 16 to the hoist cylinders 11 and controlling the pump capacity qp of the hydraulic pump 16 in accordance with the engine rotation frequency N1 to control the discharge pressure Pp and the pump discharge flow rate Qp. However, if abnormality in the regulator control system of the hydraulic pump 16, such as breakdown of the control device 31 or disconnection of the signal line connecting the control device 31 to the regulator 16a of the hydraulic pump 16, for example, occurs for some reason when the hydraulic pump 16 operates the hoist cylinders 11, it is not possible to supply an appropriate control pressure to the piston inside the regulator 16a. Therefore, it is not possible to appropriately control the hydraulic pump capacity qp, the amount of hydraulic oil supplied to the hoist cylinders 11 inevitably changes, and it is not possible to operate the hoist cylinders 11 at a desired speed.

In a case in which such abnormality occurs and the speed of the operation of the hoist cylinders 11 becomes unnecessarily high, this may lead an increase in a risk of breakdown due to a sudden change in load and an increase in noise and an increase in a risk of an accident due to sudden dropping of the loads. In a case in which the speed of the operation of the hoist cylinders 11 becomes low, this may also lead to a delay of the entire work due to an increase in operation times of the hoists.

Since the technique in Patent Document 2 does not employ a structure with which the hydraulic circuits on the operation machine and the steering side can be blocked, influences of breakdown on the hydraulic circuit that drives the fan motor appear, and it is not possible to cause the fan to operate normally in a case in which the breakdown occurs in the hydraulic circuit on the operation machine or the steering side. Also, since a structure in which the operator is notified of occurrence of abnormality is not employed, it is not possible for the operator to appropriately make determination (whether to continue traveling of the dump truck and travel to a place where maintenance can be performed, or whether to immediately stop the car, for example) in regard to the occurrence of the abnormality and to address the abnormality. Means for solving these problems is to include a display device 32 that delivers abnormality information in accordance with a determination result of the abnormality determination unit 31e to the operator, and operations thereof will be described later.

Next, abnormality determination processing executed by the arithmetic operation control unit 31d of the control device 31 and control performed in a case in which the arithmetic operation control unit 31d determines abnormality will be described.

Figure 8:
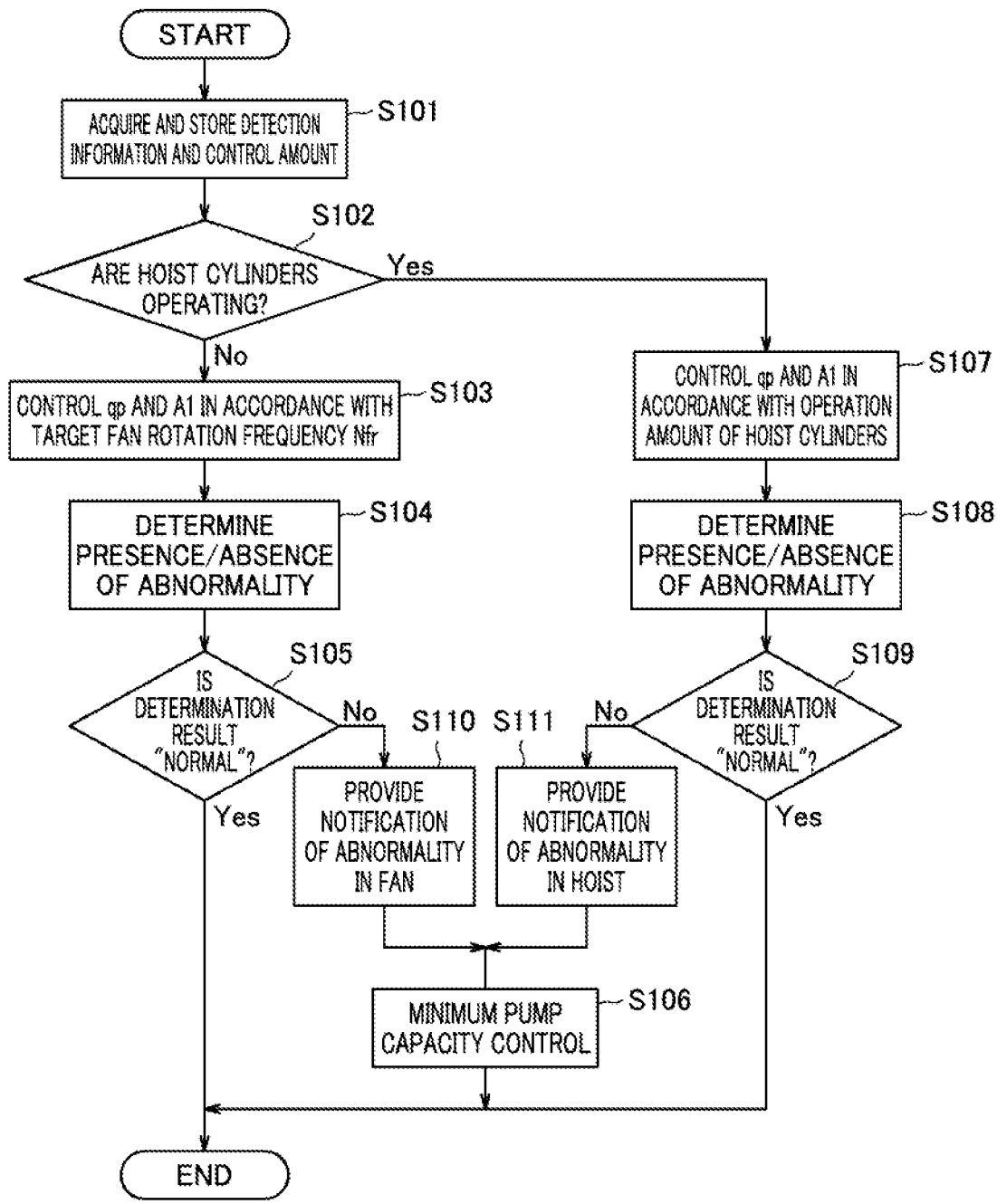
FIG. 8 is a flowchart illustrating a flow of determining content of control of a selection valve and control of the hydraulic pump, performing abnormality determination, and performing control to minimize the capacity of the hydraulic pump in a case in which abnormality is determined to have occurred.

FIG. 8 is a flowchart illustrating a flow in which the arithmetic operation control unit 31d determines content of the control of the selection valve 17 and control of the hydraulic pump 16, the abnormality determination unit 31e performs abnormality determination, and when abnormality is determined, control is performed to minimize the capacity qp of the hydraulic pump 16, in the embodiment illustrated in FIG. 3. Note that in a case in which the dump truck 1 with the hydraulic actuator control device 15 mounted therein is started from a stopping state, an initial value of a target pump capacity flag is OFF, an initial value of a minimum pump capacity flag is ON, an initial value of an operation machine pump capacity control flag is OFF, and the capacity qp of the hydraulic pump 16 is set to the minimum pump capacity qpmin by the regulator 16*a* in the flowchart.

First, in Step 101, the arithmetic operation control unit 31*d* acquires various kinds of detection information and the control amount and executes storage processing. Specifically, the arithmetic operation control unit 31*d* inputs, from the input unit 31*a*, the engine rotation frequency N1 detected by the engine rotation frequency sensor 20, the pump discharge pressure Pp detected by the pump discharge pressure sensor 27, the motor supply pressure Pm detected by the motor supply pressure sensor 28, the cooling water temperature Tw detected by the cooling water temperature sensor 29, and an output of the hoist lever 30 and stores them in the storage unit 31*c*.

Also in Step S101, the arithmetic operation control unit 31*d* acquires a pump control amount Cp to be applied to pump control, a valve control amount Cv to be applied to valve control, and a target fan rotation frequency Nfr and stores them in the storage unit 31*c*. Note that the target fan rotation frequency Nfr is calculated on the basis of a control map that defines a relationship between the cooling water temperature Tw and the target fan rotation frequency Nfr, which is not illustrated, and content of the processing of calculating the pump control amount Cp and the valve control amount Cv will be described later.

Thereafter, the processing proceeds to Step 102, the abnormality determination unit 31*e* determines whether or not the hoist cylinders 11 are operating, and if the hoist cylinders 11 are determined not to be operating and the determination result is No (negative), the processing proceeds to Step 103. In Step 103, the arithmetic operation control unit 31*d* controls the capacity qp of the hydraulic pump 16 and the opening area A1 of the selection valve 17 in accordance with the target fan rotation frequency Nfr. Content of the control will be described later on the basis of FIG. 9.

In following Step 104, the abnormality determination unit 31*e* determines whether or not measurement values of the pump discharge pressure Pp and the motor supply pressure Pm are normal values on the basis of an abnormality determination table in FIG. 12, which will be described later, and determines presence/absence of abnormality and content of the abnormality in the hydraulic actuator control device 15 from the determination result. Content of the processing will be described later. Thereafter, in Step 105, the abnormality determination unit 31*e* determines whether or not the hydraulic actuator control device 15 is normal on the basis of the determination result in Step 104.

In other words, when it is determined that abnormality has not occurred in Step 104, the abnormality determination unit 31*e* regards the hydraulic actuator control device 15 as being normal, provides a determination result of Yes (positive) in Step 105, and ends the routine. Also, when it is determined that abnormality has occurred in Step 104, the abnormality determination unit 31*e* regards abnormality as having occurred in the hydraulic actuator control device 15, provides a determination result of No in Step 105, and proceeds to Step 110. In Step 110, a control command to display a notification of fan abnormality is sent from the output unit 31*b* of the control device 31 to the display device 32, and the processing proceeds to Step 106. Here, the arithmetic operation control unit 31*d* executes control to minimize the pump capacity qp (hereinafter, referred to as minimum pump capacity control) and then ends the routine. Content of the minimum pump capacity control will be described later on the basis of FIG. 11.

On the other hand, when the abnormality determination unit 31*e* determines that the hoist cylinders 11 are operating and provides a determination result of Yes in Step 102, the processing proceeds to Step 107. In Step 107, the arithmetic operation control unit 31*d* controls the pump capacity qp and the opening area A1 of the selection valve 17 corresponding to the target hoist cylinder operation amount obtained from an input to the hoist lever 30. Content of the control will be described later on the basis of FIG. 10.

In following Step 108, the abnormality determination unit 31*e* determines whether or not the measurement values of the pump discharge pressure Pp and the motor supply pressure Pm are normal values on the basis of the abnormality determination table in FIG. 12 and determines presence/absence and content of the abnormality in the hydraulic actuator control device 15 from the determination result, similarly to Step 104 described above. Thereafter, in Step 109, whether or not the hydraulic actuator control device 15 is normal is determined on the basis of the determination result in Step 104, and the routine is ended when the determination result is Yes, or the processing proceeds to Step 111 when the determination result is No. In Step 111, a control command to display a notification of abnormality in the hoist is sent from the output unit 31*b* of the control device 31 to the display device 32, the processing proceeds to Step 106, and the arithmetic operation control unit 31*d* executes the minimum pump capacity control.

Next, details of the pump control and the valve control in accordance with the target fan rotation frequency Nfr, which are executed in Step 103 in FIG. 8 described above, will be described.

Figure 9:
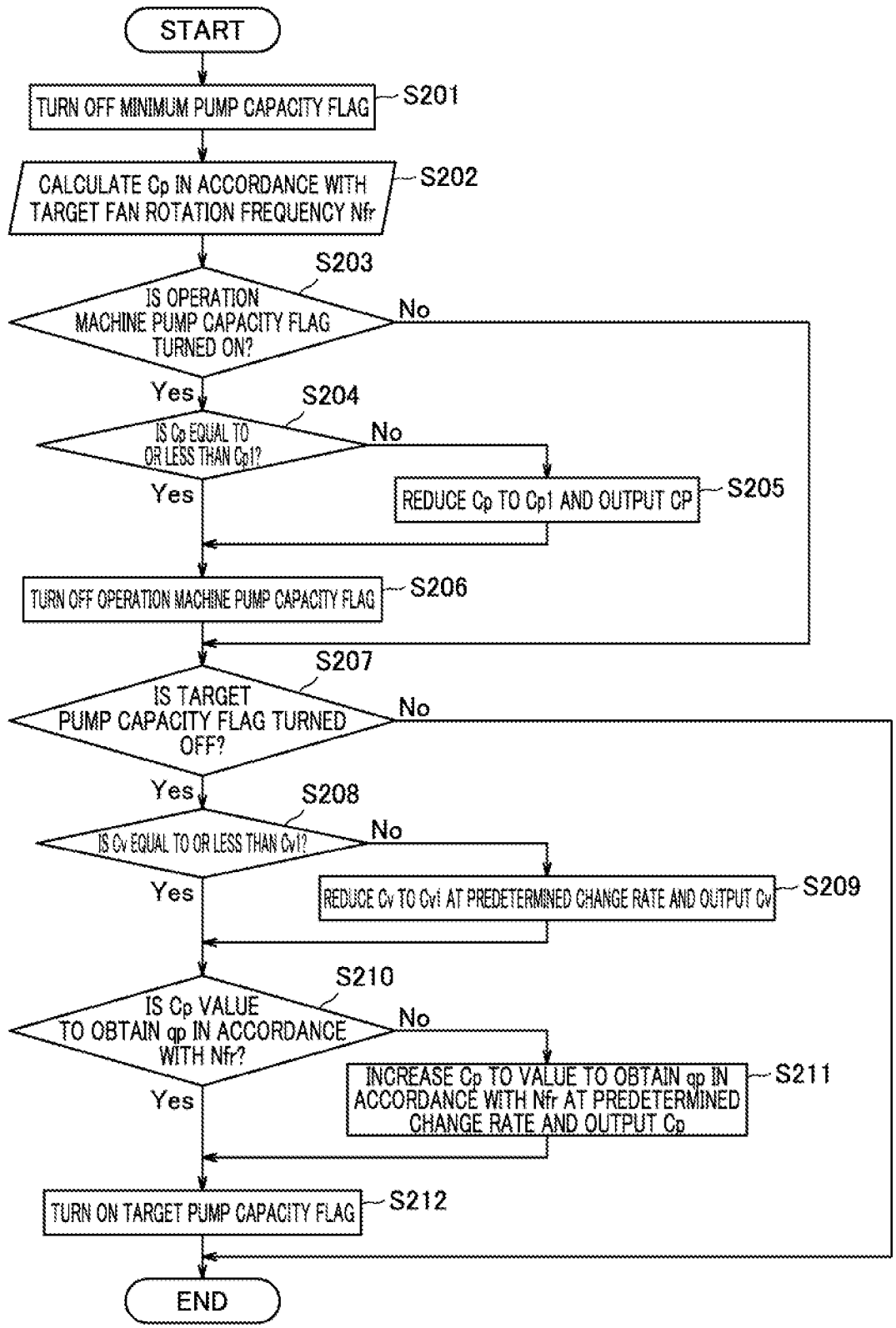
FIG. 9 is a flowchart illustrating a flow of pump control and a valve control in accordance with a target fan rotation frequency.

FIG. 9 is a flowchart illustrating flows of the pump control and the valve control in accordance with the target fan rotation frequency Nfr.

First, the arithmetic operation control unit 31*d* turns off the minimum pump capacity flag in Step 201, calculates the pump control amount Cp to obtain the capacity qp of the hydraulic pump 16 in accordance with the target fan rotation frequency Nfr on the basis of the target fan rotation frequency Nfr and the engine rotation frequency N1 in following Step 202, and then proceeds to Step 203. The abnormality determination unit 31*e* determines whether or not the operation machine pump capacity flag has been turned on in Step 203, and when the abnormality determination unit 31*e* determines that the flag has been turned off and provides a determination result of No, the processing proceeds to Step 207.

Also, when the abnormality determination unit 31*e* determines that the operation machine pump capacity flag has been turned on and provides a determination result of Yes in Step 203, the abnormality determination unit 31*e* proceeds to Step 204 and determines whether or not the pump control amount Cp that is currently output to the regulator 16*a* is equal to or less than the first pump control amount Cp1 corresponding to the minimum pump capacity qpmin. When the determination result is Yes, the processing proceeds to Step 206, and the operation machine pump capacity flag is turned off. Also, when the determination result is No in Step 204, the processing proceeds to Step 205, and the arithmetic operation control unit 31*d* lowers the pump control amount Cp to the first pump control amount Cp1, outputs the pump control amount Cp to the regulator 16*a*, and then proceeds to Step 206.

In following Step 207, the abnormality determination unit 31e determines whether or not the target pump capacity flag has been turned off, and when the determination result is No, the abnormality determination unit 31e ends the routine. Also, when the determination result is Yes in Step 207, the processing proceeds to Step 208, and whether or not the valve control amount Cv that is currently output to the selection valve 17 is equal to or less than the first valve control amount Cv1 corresponding to the maximum opening area A1max is determined. When the determination result is Yes in Step 208, the processing proceeds to Step 210. Also, when the determination result is No in Step 208, the processing proceeds to Step 209, the valve control amount Cv is reduced to the first valve control amount Cv1 at a predetermined change rate and is then output to the selection valve 17, and the processing then proceeds to Step 210.

In Step 210, the abnormality determination unit 31e determines whether or not the pump control amount Cp that is currently output to the regulator 16a is a value to obtain the capacity qp of the hydraulic pump 16 in accordance with the target fan rotation frequency Nfr. When the determination result is Yes in Step 210, the processing proceeds to Step 212, the target pump capacity flag is turned on, and the routine is then ended. Also, when the determination result is No in Step 210, the processing proceeds to Step 211, the pump control amount Cp reduced to the first pump control amount Cp1 through the processing in Step 205 described above is caused to increase to the value to obtain the capacity qp of the hydraulic pump 16 in accordance with the target fan rotation frequency Nfr at a predetermined change rate and is then output to the regulator 16a, and the processing then proceeds to Step 212.

Then, details of the pump control and the valve control in accordance with the target hoist cylinder operation amount executed in Step 107 in FIG. 8 described above will be described.

Figure 10:
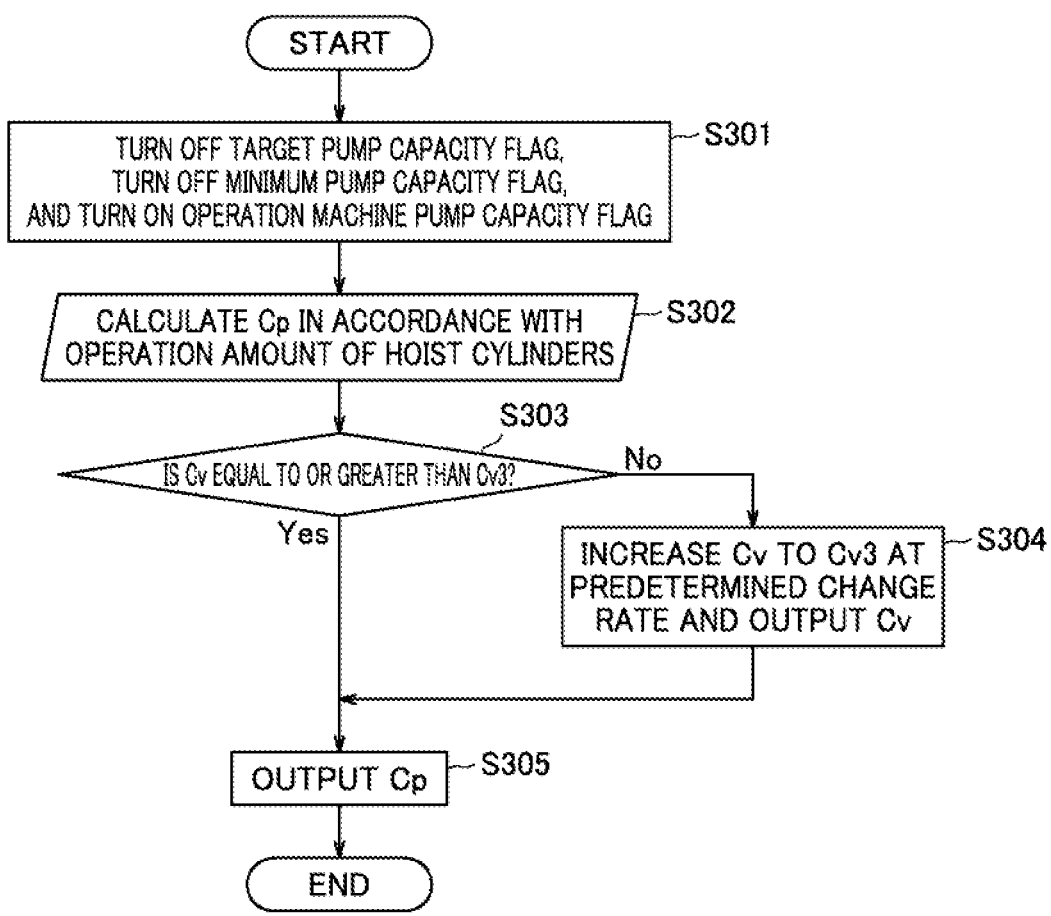
FIG. 10 is a flowchart illustrating a flow of pump control and valve control in accordance with the target amount of operations of the hoist cylinder.

FIG. 10 is a flowchart illustrating flows of the pump control and the valve control in accordance with the target hoist cylinder operation amount.

First, in Step 301, the target pump capacity flag and the minimum pump capacity flag are turned off, and the operation machine pump capacity flag is turned on. In following Step 302, the pump control amount Cp to obtain the capacity qp of the hydraulic pump 16 in accordance with the target hoist cylinder operation amount is calculated on the basis of the output of the hoist lever 30 and the engine rotation frequency N1, and the processing then proceeds to Step 303.

In Step 303, the abnormality determination unit 31e determines whether or not the valve control amount Cv that is currently output to the selection valve 17 is equal to or greater than the third valve control amount Cv3 to maximize the opening area on the side of the hoist cylinders 11 (the opening area A1 on the fan side=zero). When the determination result is Yes in Step 303, the processing proceeds to Step 305, the pump control amount Cp calculated in Step 302 described above is output, and the routine is then ended. Also, when the determination result is No in Step 303, the processing proceeds to Step 304, the valve control amount Cv is caused to increase to the third valve control amount Cv3 at a predetermined change rate and is then output to the selection valve 17, and the processing then proceeds to Step 305.

Next, details of the minimum pump capacity control executed in Step 106 in FIG. 8 described above will be described.

Figure 11:
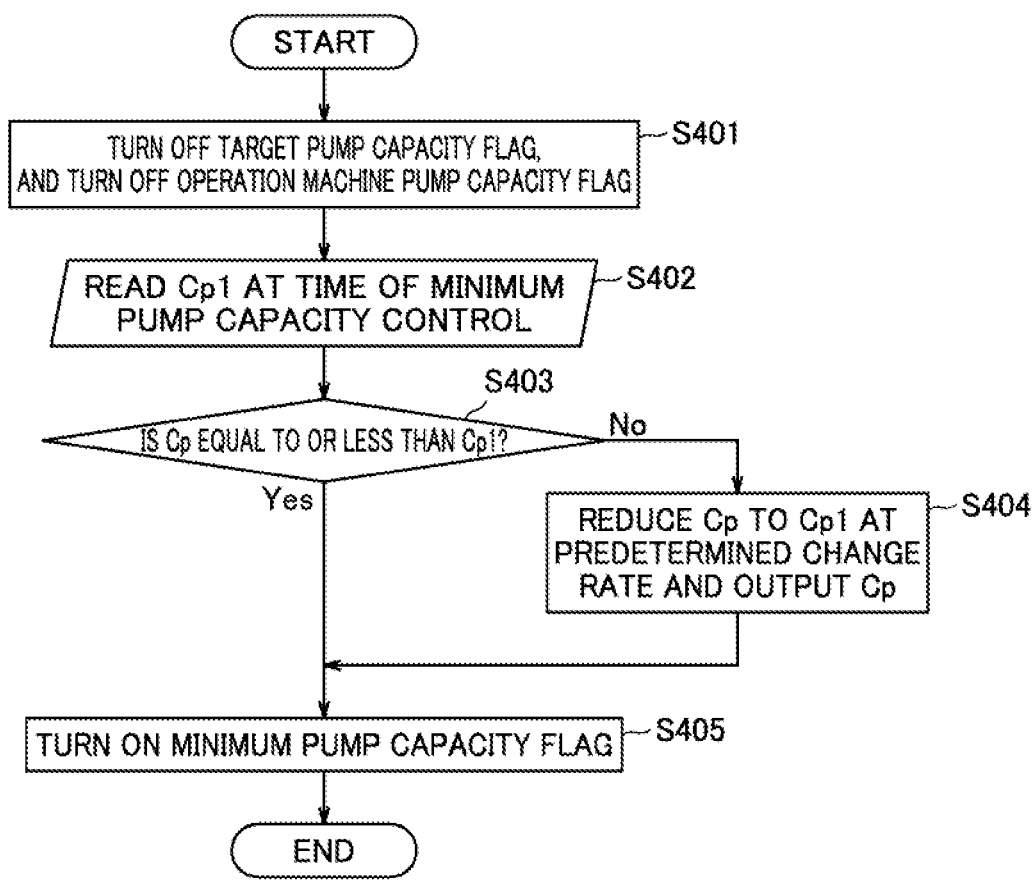
FIG. 11 is a flowchart illustrating a flow of minimum pump capacity control.

FIG. 11 is a flowchart illustrating a flow of the minimum pump capacity control.

First, in Step 401, the target pump capacity flag and the operation machine pump capacity flag are turned off. In following Step 402, the first pump control amount Cp1 set in advance as the pump control amount Cp at the time of the minimum pump capacity control is read from the storage unit 31c, and the processing proceeds to Step 403.

In Step 403, whether or not the pump control amount Cp that is currently output to the regulator 16a is equal to or less than the first pump control amount Cp1 is determined, and when the determination result is Yes, the processing proceeds to Step 405, the minimum pump capacity flag is turned on, and the routine is then ended.

Also, when the determination result is No in Step 403, the processing proceeds to Step 404, the pump control amount Cp is reduced to the first pump control amount Cp1 at a predetermined change rate and is then output to the regulator 16a, and the processing then proceeds to Step 405.

Next, operating statuses of the hydraulic actuator control device 15 executed by the aforementioned flowcharts in FIGS. 8 to 11 will be described.

The overall control is executed in accordance with the routine in FIG. 8, and in a case in which the hoist cylinders 11 are not operating in Step 102, the routine shifts to the routine in FIG. 9 from Step 103. Then, the pump capacity qp is controlled in accordance with the target fan rotation frequency Nfr through the processing in Steps 210 and 211, and the opening area A1 of the selection valve 17 is controlled in accordance with the target fan rotation frequency Nfr through the processing in Steps 208 and 209. Therefore, the prescribed hydraulic oil is discharged from the hydraulic pump 16 and is guided to the side of the cooling fan pipe conduit 23 in accordance with switching of the selection valve 17, and the cooling fan 19 is driven and rotated by the hydraulic motor 18 that has received the supply of the hydraulic oil. In this manner, the cooling fan 19 is driven and rotated at the target fan rotation frequency Nfr, generates cooling wind, and cools the engine cooling water to be distributed inside the radiator 13.

Also, in a case in which the hoist cylinders 11 are operating in Step 102 in FIG. 8, the routine shifts to the routine in FIG. 10 from Step 107. Then, the pump capacity qp is controlled in accordance with the target hoist cylinder operation amount through the processing in Steps 302 and 305, and the opening area A1 of the selection valve 17 is controlled in accordance with the target hoist cylinder operation amount through the processing in Steps 303 and 304. Therefore, the prescribed hydraulic oil is discharged from the hydraulic pump 16 and is guided to the side of the operation machine pipe conduit 24 in accordance with the switching of the selection valve 17, and the hoist cylinders 11 are driven by the hoist cylinders 11 receiving the supply of the hydraulic oil to raise and lower the loading platform 9.

Note that when the processing is shifted from Step 107 to Step 103 in FIG. 8 in accordance with an end of the operation of the hoist cylinders 11, the pump capacity qp is reduced to the minimum pump capacity qp1 through the processing in Steps 204 and 205 in FIG. 9, first. Thereafter, the selection valve 17 is shifted from the side of the hoist cylinders 11 to the side of the fan 19 in accordance with an increase in the opening area A1 through the processing in Steps 208 and 209, and in parallel with this, the pump capacity qp is adjusted to a value corresponding to the target fan rotation frequency Nfr through the processing in Steps 210 and 211.

Also, when the processing is shifted from Step 103 to Step 107 in FIG. 8 in accordance with a start of the operation of the hoist cylinders 11, the selection valve 17 is gradually switched from the side of the fan 19 to the side of the hoist cylinders 11 in accordance with a decrease in the opening area A1 through the processing in Steps 303 and 304 in FIG. 10. The aforementioned processing is a measure for preventing a sudden change in operating state of the hydraulic actuator control device 15.

On the other hand, in a case in which the abnormality determination unit 31e determines that abnormality has occurred in the hydraulic actuator control device 15 in Step 104 or Step 106 in FIG. 8, the routine shifts to the routine in FIG. 11 from Step 106. Then, the pump capacity qp is gradually reduced to the minimum pump capacity qpmin, and the pump discharge pressure Pp and the pump discharge flow rate Qp of the hydraulic pump 16 are thus reduced, through the processing in Steps 402 to 404.

Next, state determination of the hydraulic actuator control device 15 executed in Steps 104 and 108 in FIG. 8 will be described.

FIG. 12 is an abnormality determination table used for abnormality determination of the hydraulic actuator control device 15.

The abnormality determination table illustrated in FIG. 12 is used by the abnormality determination unit 31e to determine the state of the hydraulic actuator control device 15 and is stored in the storage unit 31c of the control device 31 in advance. The abnormality determination table summarizes relationships of an output of the pump discharge pressure sensor 27, an output of the motor supply pressure sensor 28, a state assumed on the basis of each output, alert display for the operator, and an execution status of pump control in each of situations when the cooling fan 19 is operating (#01 to 06) and when the hoist cylinders 11 are operating (#07 to 09).

The output of the pump discharge pressure sensor 27 and the output of the motor supply pressure sensor 28 are compared with a pump discharge pressure determination value and a motor supply pressure determination value set in advance, respectively, and the state of the hydraulic actuator control device 15 is assumed on the basis of the comparison result. The pump discharge pressure determination value and the motor supply pressure determination value are threshold values set as a pump discharge pressure Pp and the motor supply pressure Pm that are to be generated when the hydraulic actuator control device 15 operates normally (when the target fan rotation frequency Nfr and the target hoist cylinder operation amount have been achieved), respectively. According to the abnormality determination table, whether the measurement values are within predetermined ranges (normal) around the pressure determination values or whether the measurement values are separated from the predetermined ranges on the increase side or the decrease side (abnormal), on the basis of the result of the comparison between the pressure determination values and the measurement values of the pump discharge pressure Pp and the motor supply pressure Pm. It is a matter of course that the pressure determination values are also stored in the storage unit 31c of the control device 31 along with the abnormality determination table.

Note that a plurality of pump discharge pressure determination values and motor supply pressure determination values are each set to correspond to operating statuses of the hydraulic actuator control device 15. In other words, the pump discharge pressure Pp and the motor supply pressure Pm vary in accordance with an increase or a decrease in the target fan rotation frequency Nfr when the cooling fan 19 is operating, and the pump discharge pressure Pp varies in accordance with an increase or decrease of the target hoist cylinder operation amount, and the motor supply pressure Pm is reduced to a value that is equal to or less than a zero determination value, which will be described later, when the hoist cylinders 11 are operating. Thus, the plurality of pressure determination values are set in advance to correspond to the target fan rotation frequency Nfr and the target hoist cylinder operation amount, and the pressure determination values corresponding to the current operating status of the hydraulic actuator control device 15 are selected from these and are applied to the determination processing.

01 to 06 assumes the time when the cooling fan 19 is operating, and at this time, the capacity qp of the hydraulic pump 16 and the opening area A1 of the selection valve 17 are controlled in accordance with the target fan rotation frequency Nfr, and the cooling fan 19 is driven and rotated by the hydraulic motor 18 to which the hydraulic oil has been supplied from the hydraulic pump 16. Also, in a case in which the hydraulic actuator control device 15 is operating normally, the pressures within the predetermined ranges around the aforementioned pressure determination values described above are detected by the sensors 27 and 28 at installation locations of the pump discharge pressure sensor 27 and the motor supply pressure sensor 28.

In #01, as illustrated in the abnormality determination table, the measurement value of the pump discharge pressure Pp is within the predetermined range around the pump discharge pressure determination value, and the measurement value of the motor supply pressure Pm is within the predetermined range around the motor supply pressure determination value. Therefore, the prescribed hydraulic oil is discharged from the hydraulic pump 16 and is then guided to the side of the cooling fan pipe conduit 23 in accordance with the switching of the selection valve 17, and the hydraulic motor 18 receives the supply of the hydraulic oil and thereby drives and rotates the cooling fan 19 at the target fan rotation frequency Nfr, and it is possible to regard the hydraulic actuator control device 15 as being operating normally. Therefore, the determination result of Yes is obtained in Step 105 in FIG. 8 in the case of #01, and the notification of the abnormality of the fan in Step 110 is not executed. Also, the control to address abnormality in following Step 106 is also not executed, and ordinary control is continued.

In #02, the measurement value of the pump discharge pressure Pp is within the predetermined range around the pump discharge pressure determination value while the measurement value of the motor supply pressure Pm is separated from the motor supply pressure determination value on the increase side or the decrease side. As a factor thereof, it is possible to predict a detection error or the like due to breakdown of the motor supply pressure sensor 28, for example.

In #03, the measurement value of the pump discharge pressure Pp is separated from the pump discharge pressure determination value on the increase side or the decrease side while the measurement value of the motor supply pressure Pm is within the predetermined range around the motor supply pressure determination value. As a factor thereof, it is possible to predict a detection error or the like due to breakdown of the pump discharge pressure sensor 27, for example.

In #04, both the measurement values of the pump discharge pressure Pp and the motor supply pressure Pm are separated from the corresponding pressure determination values on the decrease side. As a factor thereof, it is possible to predict, for example, a situation in which a power is not supplied normally to each device in the hydraulic actuator control device 15 (hereinafter, simply referred to as a power defect), breakdown of the control device 31, breakdown of the hydraulic pump 16 or the selection valve 17, disconnection of the signal line 16*b* connecting the output unit 31*b* of the control device 31 to the regulator 16*a* of the hydraulic pump 16, disconnection of the signal line 17*b* connecting the output unit 31*b* of the control device 31 to the valve drive body 17*a* of the selection valve 17, or oil leakage from a hose or a piping at each location in the hydraulic actuator control device 15.

In #05, both the measurement values of the pump discharge pressure Pp and the motor supply pressure Pm are separated from the corresponding pressure determination values on the increase side. As a factor thereof, it is possible to predict, for example, a power defect, breakdown of the control device 31, breakdown of the hydraulic pump 16 or the selection valve 17, disconnection of the signal line 16*b* connecting the output unit 31*b* of the control device 31 to the regulator 16*a* of the hydraulic pump 16, disconnection of the signal line 17*b* connecting the output unit 31*b* of the control device 31 to the valve drive body 17*a* of the selection valve 17, clogging of the hose or the piping at each location in the hydraulic actuator control device 15, or a rotation obstacle when a resistance acts on the cooling fan 19 for some reason.

In #06, the measurement values of the pump discharge pressure Pp and the motor supply pressure Pm are in detection statuses other than #01 to 05 described above. As a factor, it is possible to predict a detection error or the like due to breakdown of any of the pump discharge pressure sensor 27 or the motor supply pressure sensor 28, for example.

Then, in the aforementioned cases #02 to 06, the determination result of No is obtained in Step 105 in FIG. 8, the notification of abnormality in the fan is provided in Step 110, the minimum pump capacity control in FIG. 11 is executed as control for addressing the abnormality instead of the ordinary control, and the pump capacity qp is controlled to the minimum pump capacity qpmin. Then, once the operation of the hoist cylinders 11 is started, the minimum pump capacity control is ended, and the processing returns to the ordinary control.

On the other hand, #07 to 09 assumes the time when the hoist cylinders 11 are operating, and at this time, the capacity qp of the hydraulic pump 16 and the opening area A1 of the selection valve 17 are controlled in accordance with the target hoist cylinder operation amount, and the loading platform 9 is raised and lowered by the hoist cylinders 11 receiving the supply of the hydraulic oil from the hydraulic pump 16. If the hydraulic actuator control device 15 is operating normally, the pressure that conforms to the pump discharge pressure determination value is detected at the installation location of the pump discharge pressure sensor 27, and the pressure is reduced to about zero at the installation location of the motor supply pressure sensor 28 in this case as well.

In #07, as illustrated in the abnormality determination table, the measurement value of the pump discharge pressure Pp is within the predetermined range around the pump discharge pressure determination value, and the measurement value of the motor supply pressure Pm is less than the zero determination value (<motor supply pressure determination value) set on the positive side near zero as a threshold value separately from the motor supply pressure determination value. The oil pressure of the hydraulic circuit is not completely reduced to zero due to the hydraulic oil that is present therein even in a state in which the hydraulic oil is not supplied. In view of this point, it is possible to predict that the hydraulic oil has not been supplied to the side of the hydraulic motor 18 in the case in which the zero determination value is set and the oil pressure that is equal to or less than the zero determination value is detected.

Therefore, the prescribed hydraulic oil is discharged from the hydraulic pump 16 and is then guided to the side of the operation machine pipe conduit 24 in accordance with the switching of the selection valve 17, the hoist cylinders 11 receives the supply of the hydraulic oil and are then driven, and it is thus possible to regard the hydraulic actuator control device 15 as being operating normally. Therefore, a determination result of Yes is obtained in Step 109 in FIG. 8 in the case of #07, the notification of abnormality in the fan in Step 110 is not executed, and the control for addressing the abnormality in following Step 106 is also not executed.

In #08, the measurement value of the pump discharge pressure Pp is within the predetermined range around the pump discharge pressure determination value while the measurement value of the motor supply pressure Pm is equal to or greater than the zero determination value. As a factor thereof, it is possible to predict a detection error or the like due to breakdown of the motor supply pressure sensor 28, for example.

In #09, the measurement values of the pump discharge pressure Pp and the motor supply pressure Pm are in detection statuses other than #07 and 08 described above, and as a factor thereof, it is possible to predict, for example, a detection error due to breakdown of any of the pump discharge pressure sensor 27 or the motor supply pressure sensor 28, a power defect, breakdown of the control device 31, breakdown of the hoist cylinders 11, breakdown of the hydraulic pump 16 or the selection valve 17, breakdown of the hoist lever 30, disconnection of the signal line 17*b* connecting the output unit 31*b* of the control device 31 to the valve drive body 17*a* of the selection valve 17, disconnection of the signal line 30*a* connecting the input unit 31*a* of the control device 31 to the hoist lever 30, or oil leakage from the hose or the piping at each location in the hydraulic actuator control device 15.

Then, in the cases of #08 and 09 described above, the determination result of No is obtained in Step 109 in FIG. 8, the notification of abnormality in the fan is provided in Step 110, and the minimum pump capacity control in FIG. 11 is executed. Then, once the operation of the hoist cylinders 11 is stopped and the operation of the fan is started, the processing returns to the ordinary control.

As described above, according to the hydraulic actuator control device 15 for the dump truck 1 in the present embodiment, it is possible to appropriately determine not only abnormality in the regulator control system of the hydraulic pump 16 but also abnormality in the entire hydraulic circuit (that is, all types of abnormality listed in #02 to 06, and #07 and 08 described above) constituting the hydraulic actuator control device 15. Also, in a case in which it is determined that abnormality has occurred in the fan or the hoist, it is possible to more reliably prevent a failure caused by the abnormality as compared with the technique in Patent Document 2 since the capacity qp of the hydraulic pump 16 is controlled to the minimum pump capacity qpmin through execution of the minimum pump capacity control.

In other words, since the technique in Patent Document 2 in which the fan is driven at the intermediate rotation frequency between the maximum and minimum rotation frequencies cannot sufficiently reduce the fan rotation frequency, it is not possible to prevent a failure caused by abnormality in a case in which the maximum values of the discharge pressure and the discharge flow rate of the hydraulic pump are large, in particular. On the other hand, according to the present embodiment, the pump capacity qp is controlled to the minimum pump capacity qpmin, and it is thus possible to sufficiently reduce the fan rotation frequency Nfr. Therefore, it is possible to curb energy consumption through reduction of the load on the engine 12 that drives the hydraulic pump 16, to reduce noise through reduction of the fan rotation frequency Nfr, and to curb waste or a risk of breakdown of the cooling fan 19 and the hydraulic devices such as a hydraulic motor.

Also, a notification indicating abnormality in the fan is provided to the operator through the display device 32 in a case in which it is determined that abnormality has occurred in the fan, and a notification indicating abnormality in the hoist is provided to the operator through the display device 32 in a case in which it is determined that abnormality has occurred in the hoist. Therefore, it is possible for the operator to immediately make determination in accordance with the abnormal location, and for example. That is, for example, the operator can immediately stop the dump truck in the case in which abnormality in the fan is determined, or the operator can suspend or complete the hoist operation and quickly travel and return to an area where maintenance can be performed in the case in which abnormality in the hoist is determined.

Also, it is possible to cause only either one of the fan 19 and the hoist cylinders 11 to operate by the selection valve 17. Therefore, even in a case in which abnormality has occurred in either the fan 19 and the hydraulic circuit that is continuous with the fan 19 or in the hoist cylinders 11 and the hydraulic circuit that is continuous with the hoist cylinders 11, and the capacity of the hydraulic pump 16 is maximized when the other hydraulic circuit that is normal is caused to operate, the hydraulic oil is not supplied to the location of the abnormal one, and the operation of the other normal one is thus not prevented.

Incidentally, in a case in which a power defect, breakdown of the control device 31, or disconnection of the signal line 16b connecting the control device 31 to the hydraulic pump 16, for example, has occurred, there is a probability that the pump control amount Cp is not output (Cp=zero) from the control device 31 to the hydraulic pump 16, and in that case, it is not possible to control the pump capacity qp to the minimum pump capacity qpmin through active control. However, since the hydraulic pump 16 in the present embodiment is of a positive control type in which the pump capacity qp is reduced with a decrease in pump control amount Cp, the pump capacity qp decreases to the minimum pump capacity qpmin by itself when the pump control amount Cp becomes zero. Therefore, it is possible to reliably prevent a failure caused by abnormality even in a case in which the aforementioned situation happens.

However, the hydraulic pump 16 according to the present invention is not limited to the positive control type, and a negative control-type hydraulic pump may be used instead.

Although the description of the embodiment will end here, aspects of the present invention are not limited to the embodiment. For example, although the heat exchanger is assumed to be the radiator 13 that cools the engine cooling water in the present invention, the heat exchanger is not limited thereto and may be an oil cooler that cools an engine oil, for example.

EXPLANATION OF REFERENCE SIGNS

1 Dump truck
11 Hoist cylinder
12 Engine
15 Hydraulic actuator control device
16 Hydraulic pump
16a Regulator
16b, 17b, 30a Signal line
17 Selection valve
18 Hydraulic motor
27 Pump discharge pressure sensor
28 Motor supply pressure sensor
30 Hoist lever
31 Control device
31c Storage unit
31d Arithmetic operation control unit
31e Abnormality determination unit

The invention claimed is:

1. A hydraulic actuator control device for a dump truck including
   a variable capacity-type hydraulic pump that is driven and rotated by an engine and has a capacity adjusted by a regulator,
   a hydraulic motor, to which hydraulic oil is supplied from the hydraulic pump, which is driven on the basis of a first pressure target value to drive and rotate a cooling fan for cooling a heat exchanger,
   a hoist cylinder, to which the hydraulic oil is supplied from the hydraulic pump, which is driven on the basis of a second pressure target value to raise and lower a loading platform for carrying loads,
   a selection valve that selectively supplies the hydraulic oil from the hydraulic pump to the hydraulic motor or the hoist cylinder, and
   an arithmetic operation control unit that controls drive of the regulator of the hydraulic pump and the selection valve to achieve the first or second pressure target value,
   the hydraulic actuator control device for a dump truck comprising:
   a pump discharge pressure sensor that detects a pressure of the hydraulic oil discharged from the hydraulic pump as a pump discharge pressure;
   an actuator supply pressure sensor that detects a pressure of the hydraulic oil supplied to the hydraulic motor via the selection valve as an actuator supply pressure; and
   an abnormality determination unit that determines presence/absence of abnormality in the hydraulic motor or the hoist cylinder on the basis of the pump discharge pressure and the actuator supply pressure,
   wherein the arithmetic operation control unit drives the regulator and performs control to minimize the capacity of the hydraulic pump in a case in which the abnormality determination unit determines that abnormality has occurred in the hydraulic motor or the hoist cylinder.

2. The hydraulic actuator control device according to claim 1, further comprising:
   a storage unit that stores, as a pressure determination value, each of the pump discharge pressure and the actuator supply pressure generated when the drive of the regulator and the selection valve is controlled and the first and second pressure target values have been achieved,
   wherein the abnormality determination unit determines whether or not the pump discharge pressure and the actuator supply pressure are normal values on the basis of comparison of the pump discharge pressure detected by the pump discharge pressure sensor and the actuator supply pressure detected by the actuator supply pressure sensor with each pressure determination value.

3. The hydraulic actuator control device according to claim 1, wherein the abnormality determination unit determines, as abnormality in the hydraulic actuator control device, at least any one of a power defect in each device constituting the hydraulic actuator control device, breakdown of the arithmetic operation control unit, breakdown of the hydraulic motor and the hoist cylinder, breakdown of an operation device for operating the hoist cylinder, disconnection of a signal line connecting the arithmetic operation control unit to the hydraulic pump, disconnection of a signal line connecting the arithmetic operation control unit to the selection valve, disconnection of a signal line connecting the arithmetic operation control unit to the operation device, oil leakage or clogging at each location in the hydraulic actuator control device, and breakdown of the pump discharge pressure sensor or the actuator supply pressure sensor, and the hydraulic actuator control device further comprises a display device that notifies an operator of abnormality in a case in which the abnormality determination unit determines that abnormality has occurred in the hydraulic control device.

4. The hydraulic actuator control device according to claim 1, wherein the abnormality determination unit determines presence/absence of abnormality in the hydraulic actuator control device and content of the abnormality on the basis of an abnormality determination table in which relationships of a result of determining whether or not the pump discharge pressure and the actuator supply pressure are normal values and the presence/absence of the abnormality and the content of the abnormality in the hydraulic actuator control device are summarized.

5. The hydraulic actuator control device according to claim 1, wherein the hydraulic pump is of a positive control type in which the capacity is reduced with a decrease in control amount input to control drive of the regulator.

* * * * *